(12) United States Patent
Goldfarb et al.

(10) Patent No.: US 6,585,445 B1
(45) Date of Patent: Jul. 1, 2003

(54) SPLIT TUBE FLEXURE

(75) Inventors: Michael Goldfarb, Franklin, TN (US); John E. Speich, Nashville, TN (US)

(73) Assignee: Vanderbilt University, Nashville, TN (US)

(*) Notice: Subject to any disclaimer, the term of this patent is extended or adjusted under 35 U.S.C. 154(b) by 0 days.

(21) Appl. No.: 09/403,509

(22) PCT Filed: Apr. 21, 1998

(86) PCT No.: PCT/US98/08078

§ 371 (c)(1),
(2), (4) Date: Jan. 18, 2000

(87) PCT Pub. No.: WO98/48187

PCT Pub. Date: Oct. 29, 1998

(51) Int. Cl.$^7$ .............................. F16C 11/00; F16F 1/14
(52) U.S. Cl. ...................... 403/344; 403/222; 403/223; 403/291; 267/160; 464/78; 464/88
(58) Field of Search ............................... 403/222, 223, 403/291, 344, 271; 464/78, 86, 88; 256/59; 267/160

(56) References Cited

U.S. PATENT DOCUMENTS

| | | | |
|---|---|---|---|
| 1,643,555 A | * 9/1927 | Gledhill | ........................ 256/59 |
| 3,073,584 A | 1/1963 | Troeger | |
| 3,181,918 A | 5/1965 | Troeger | |
| 3,188,071 A | 6/1965 | Owen | |
| 3,227,250 A | 1/1966 | Cram | |
| 3,527,062 A | 9/1970 | Bilinski et al. | |
| 3,544,175 A | 12/1970 | Tooker | |
| 3,597,938 A | 8/1971 | Hellen | |
| 3,700,290 A | 10/1972 | Ensinger | |
| 3,700,291 A | 10/1972 | Hadland | |
| 3,811,172 A | 5/1974 | Bilinski et al. | |
| 4,111,605 A | * 9/1978 | Roman et al. | .......... 416/141 X |
| 4,114,402 A | 9/1978 | Craig et al. | |
| 4,179,104 A | 12/1979 | Skinner et al. | |
| 4,261,211 A | 4/1981 | Haberland | |
| 4,269,072 A | 5/1981 | Duncan | |
| 4,389,809 A | * 6/1983 | Fischer | .................... 403/297 X |
| 4,521,003 A | * 6/1985 | Odobasic | ................ 403/228 X |
| 4,593,889 A | * 6/1986 | Odobasic | ................ 403/228 X |
| 4,609,302 A | 9/1986 | Kittell | |
| 4,621,949 A | 11/1986 | Marshall et al. | |
| 4,659,069 A | * 4/1987 | Odobasic | ................ 403/228 X |
| 4,915,672 A | 4/1990 | Girguis | |
| 5,160,811 A | * 11/1992 | Ritzmann | ................ 403/286 X |
| 5,213,436 A | 5/1993 | Fichtner et al. | |

OTHER PUBLICATIONS

F.P.J. Rimrott, "Two Secondary Effects in Bending of Slit Thin–Walled Tubes", Journal of Applied Mechanics, Mar. 1966, pp. 75–78.*

* cited by examiner

Primary Examiner—Lynne H. Browne
Assistant Examiner—Ernesto Garcia
(74) Attorney, Agent, or Firm—Waddey & Patterson, P.C.; Mark J. Patterson

(57) ABSTRACT

This application describes the design of the split-tube flexure, a unique precision revolute joint that exhibits a considerably larger range of motion and significantly better multi-axis revolute joint characteristics than a conventional flexure. The development of this joint enables the implementation of spatially-loaded revolute joint-based precision machines with well-behaved kinematic and dynamic characteristics and without the backlash and stick-slip behavior that would otherwise prevent precision machine control.

17 Claims, 9 Drawing Sheets

SPLIT TUBE FLEXURE

TECHNICAL FIELD

This invention relates generally to the field of mechanical connections and more particularly to flexure joints.

BACKGROUND ART

Effective implementation of precision control is largely influenced by the open-loop behavior of a machine. In particular, the presence of hard nonlinearities such as backlash and Coulomb friction results in significant deterioration of machine control. The elimination of hard nonlinearities enables effective and accurate position and force control of a precision machine.

Some classes of machines are particularly sensitive to the presence of backlash and Coulomb friction. Due to the physics of scaling, devices that operate on a microscopic scale are influenced by highly nonlinear surface forces to a much greater degree than those of a conventional scale. Consequently, a scaled-down micromachine is significantly more sensitive to Coulomb friction than its conventional-scale counterpart. Successful development of small-scale and micro-scale precision machines requires elimination or intelligent minimization of surface force behavior.

Machines that operate in a zero-gravity environment, such as satellites and spacecraft, are also particularly sensitive to Coulomb-type bearing friction, primarily because gravity is no longer the dominate mechanical influence.

Flexure-based Design

Most conventional mechanisms rely on sliding and rolling at a fundamental level. Kinematic linkages, for example, cannot be constructed without revolute joints, which almost universally incorporate roller or journal bearings. In conventional machines, such designs can provide low friction rotation while bearing significant loads. Precision motion, however, as well as small-scale and zero gravity applications, require open-loop behavior that is devoid of any significant stick-slip behavior. A flexure-base joint, which utilizes deformation as a means of providing movement, is a viable alternative to the conventional revolute joint that does not exhibit any significant backlash or Coulomb friction and is free of lubricants. A diagram of a conventional flexure 2 is shown in FIG. 1. The basic characteristics of conventional flexure joints have been studied by several researchers [1,2,3,4].

References

[1] Goldfarb, M. and Celanovic, N., "Minimum Surface-Effect Microgripper Design for Force-Reflective Telemanipulation of a Microscopic Environment," Proceedings of the ASME International Mechanical Engineering Conference and Exposition, November 1996.

[2] Horie M., Nozaki T., Ikegami K., and Kobayashi, F., "Design System of Super Elastic Hinges and its Application to Manipulator for Micro-Bonding by Adhesives," Proceedings of the International Symposium on Microsystems, Intelligent Materials, and Robots, pp. 185–188, 1995.

[3] Paros, J. and Weisbord, L., "How to Design Flexure Hinges," Machine Design, Vol. 37, No. 27, pp. 151–156, 1965.

[4] Ragulskis K., Arutunian M., Kochikian A., and Pogosian M., "A Study of Fillet Type Flexure Hinges and Their Optimal Design," Vibration Engineering, pp. 447–452, 1989.

If properly designed, a flexure-based structure can approximate the motion of a complex kinematic linkage with negligible stick-slip friction and no backlash. Additionally, the absence of rolling and sliding surfaces produces a device that is free of lubricants and thus extremely conducive to clean environments. Conventional flexures, however have several significant deficiencies. One particularly restrictive deficiency is the limited range of motion. Depending on the flexure geometry and material properties, a flexure will begin exhibiting plastic deformation at ranges on the order of five to ten degrees of rotation. In contrast, an ideal revolute joint has an infinite range of motion.

Another significant problem with conventional flexures is the poor properties exhibited when subjected to multi-axis loading. An ideal revolute joint is infinitely rigid in all directions of loading except the desired axis of rotation. In contrast, a conventional flexure exhibits a significant stiffness along the desired axis of rotation and significant compliance along all other axes of loading. A flexure-based joint, for example, will exhibit twist-bend buckling when subjected to twisting. The multi-axis behavior of conventional flexure joints results in both kinematic and dynamic problems, especially when utilizing non-collocated control that relies upon kinematic transformations for task-space accuracy.

What is needed, then, is a joint that enables the implementation of precision spatially-loaded revolute joint-based machines with well-behaved kinematic characteristics and without the backlash and stick-slip behavior that would otherwise prevent precision control.

The new joint or flexure should: exhibit no backlash or stick-slip behavior; exhibit off-axis stiffnesses significantly greater than a comparable conventional flexure; enable greater range of motion than a comparable conventional flexure; and withstand more load than a conventional flexure. Such a joint is lacking in the prior art.

DISCLOSURE OF THE INVENTION

As mentioned previously, an ideal revolute joint is characterized by zero stiffness along the axis of rotation and infinite stiffness along all other axes of loading. Conventional flexure joints offer the benefit of zero backlash and Coulomb friction, but not without limitation. Conventional flexure joints are constrained to a small range of motion and are subject to significant stiffness along the axis of rotation and significant compliance along other axes. This application describes a new flexure that exhibits a considerably larger range of motion and significantly better multi-axis revolute joint characteristics than a conventional flexure.

The design of the joint is based upon contrasting the torsional compliance of an open section with its stiffnesses in compression and bending. The torsional mechanics of closed section and open section members are fundamentally and significantly different, while the bending and compressive mechanics of the members are quite similar. This difference in mechanics enables minimization of torsional stiffness and maximization of all other stiffnesses in a nearly decoupled manner.

One embodiment of the invention includes a split-tube flexure. The split-tube flexure includes a thin-waled shaft, a first arm, and a second arm. The shaft is not required to be thin-walled. It may be a generic tube having nearly any conventional of cross-section, including polygonal. Preferably, the tube is a thin-walled nearly closed split cylinder, or hollow shaft. The wall thickness is variable as well. Thus, this invention is not limited to thin-walled hollow shafts. Design requirements, such as a required strength or stiffness, will drive the design parameters (the structural dimensions and material properties).

The thin-walled shaft includes a wall, first and second ends, and a length between the first and second ends. The wall defines a lengthwise slit therein. The first link is attached to the shaft. The second link includes a length and is attached to the shaft transversely to the slit. In one embodiment, the shaft includes mounting holes at each end-to attach the first and second links. The mounting holes should be on a longitudinal axis opposite the slit.

Another embodiment of the split-tube flexure includes a second thin-walled shaft attached to the single split-tube flexure to form a compound split-tube flexure. Typically the shafts are aligned co-linear (end-to-end), though the only requirement is that the mounting holes of both tubes remain co-linear. The entire cross section of the first end of the first tube need not be co-linear with the entire cross section of the first end of the second tube, i.e. the respective centroids need not be aligned. A first end of the first tube typically faces a first end of the second tube. The first link is attached to the first ends of the tubes. A second link is attached to second ends of the tube. The links need not be attached at end points of course.

The invention includes a method of providing pivotal motion with a flexure joint. The method typically entails providing a first thin-walled shaft (or similar design constrained structure) having a lengthwise slit; attaching a first link to the thin-walled shaft, where the first link extends transversely to the slit (typically perpendicular). And attaching a second link to the first thin-walled shaft, the second link also extending transverse to the slit. Applying a force at the first arm, where the force has a vector component perpendicular to the slit. Applying the axial force will create reactive forces at the second arm, and thereby achieve minimal force resistance along the axis of rotation and relatively large force resistance along other axes of the flexure joint.

One objective of the invention is to provide a new flexure-based revolute joint that offers significantly better properties than a conventional flexure. More specific objectives of the invention are to provide a joint which exhibits little to no backlash or stick-slip behavior, and which exhibits off-axis stiffnesses significantly greater than a comparable conventional flexure. A further objective of the invention is to provide a mechanism which enables greater range of motion compared to a conventional flexure.

Another objective of the invention is to provide a joint which withstands more load than a conventional flexure.

A broader objective of the invention is to provide a joint that enables the implementation of a precision spatially-loaded revolute joint-based machines with well-behaved kinematic characteristics and without the backlash and stick-slip behavior that would otherwise prevent precision control. Another object of the invention is to provide this flexure in a lubricant free environment suitable for 'clean' environments and space-based applications.

Figure 3A:
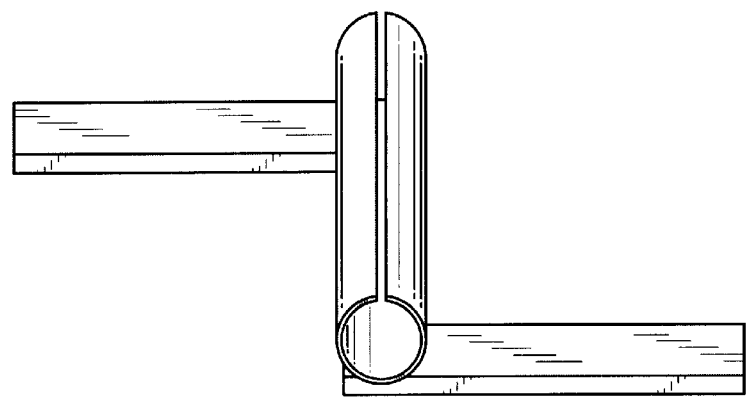

FIG. 3a, b, and c are perspective views of the split-tube flexure of the present invention in relaxed and flexed positions.

Figure 4:
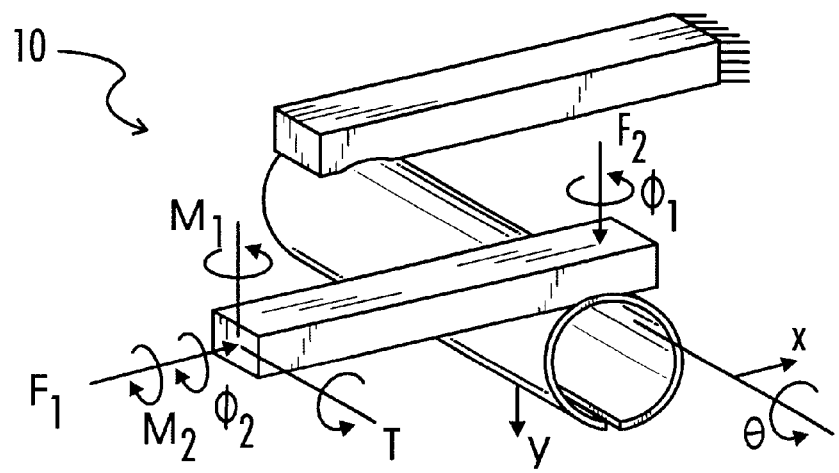

FIG. 4 is a perspective of view showing the axes of loading for a split-tube flexure joint of the present invention.

Figure 5:
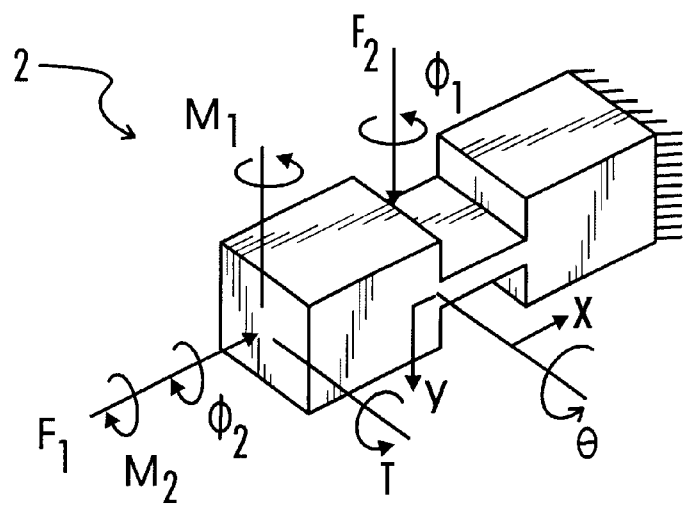

FIG. 5 is a perspective view showing the axes of loading for a conventional flexure joint.

Figure 6A:
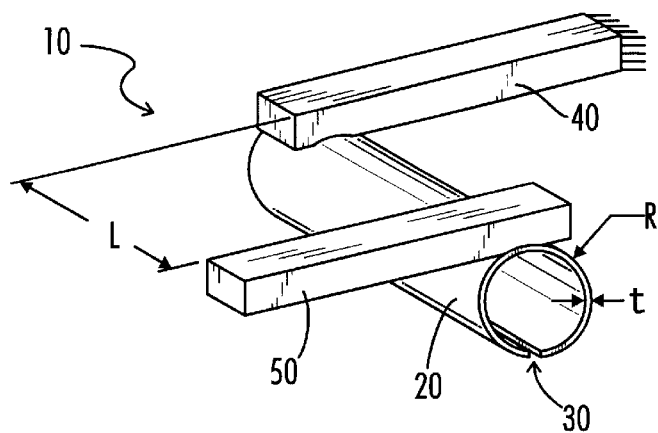
Figure 6B:
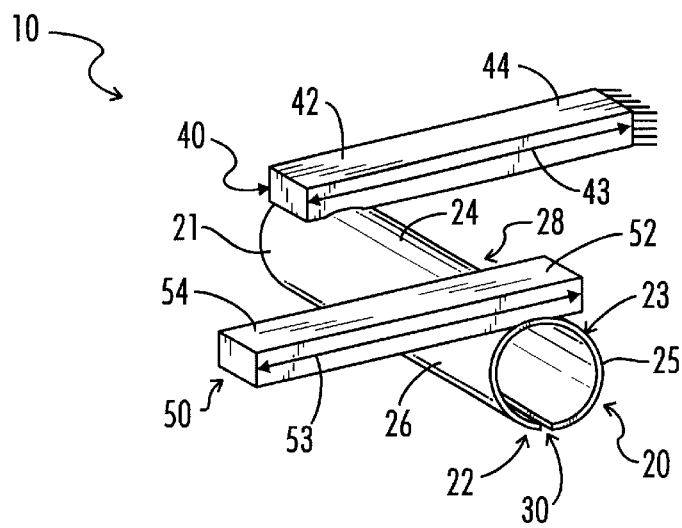

FIGS. 6a and 6b are perspective views showing the geometry of a split-tube flexure joint of the present invention.

Figure 7:
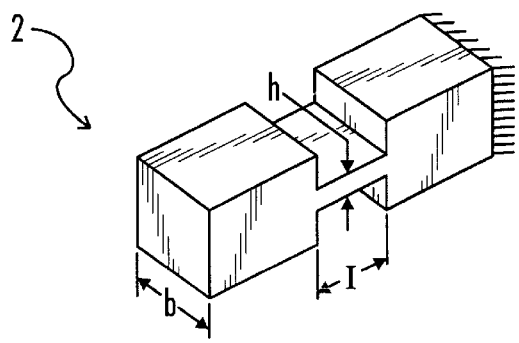

FIG. 7 is a perspective view showing the geometry of a conventional flexure joint.

Figure 8A:
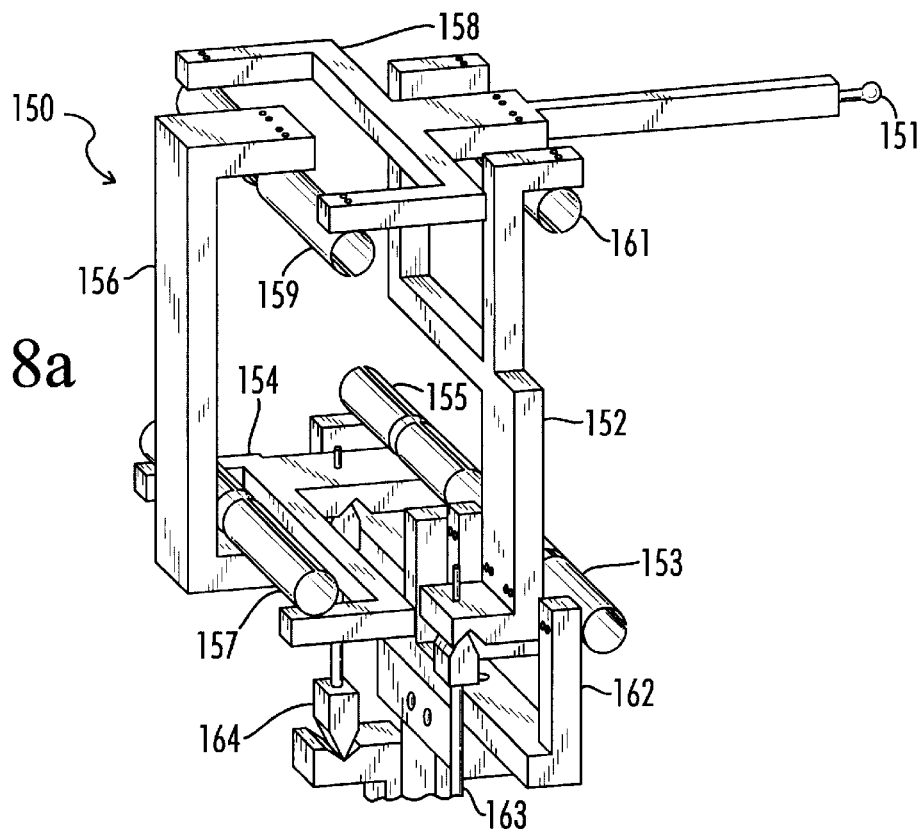
Figure 8B:
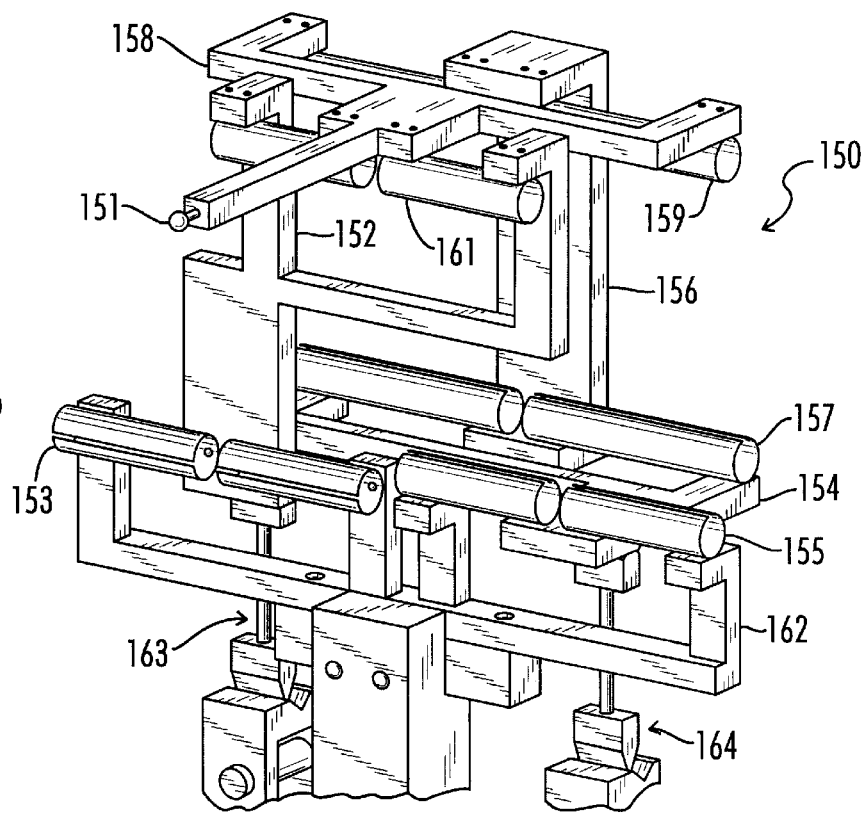

FIG. 8a and 8b are perspective (solid model) views of another embodiment of the split-tube flexure of the present invention as used in a two degree-of-freedom five-bar parallel linkage.

Figure 9:
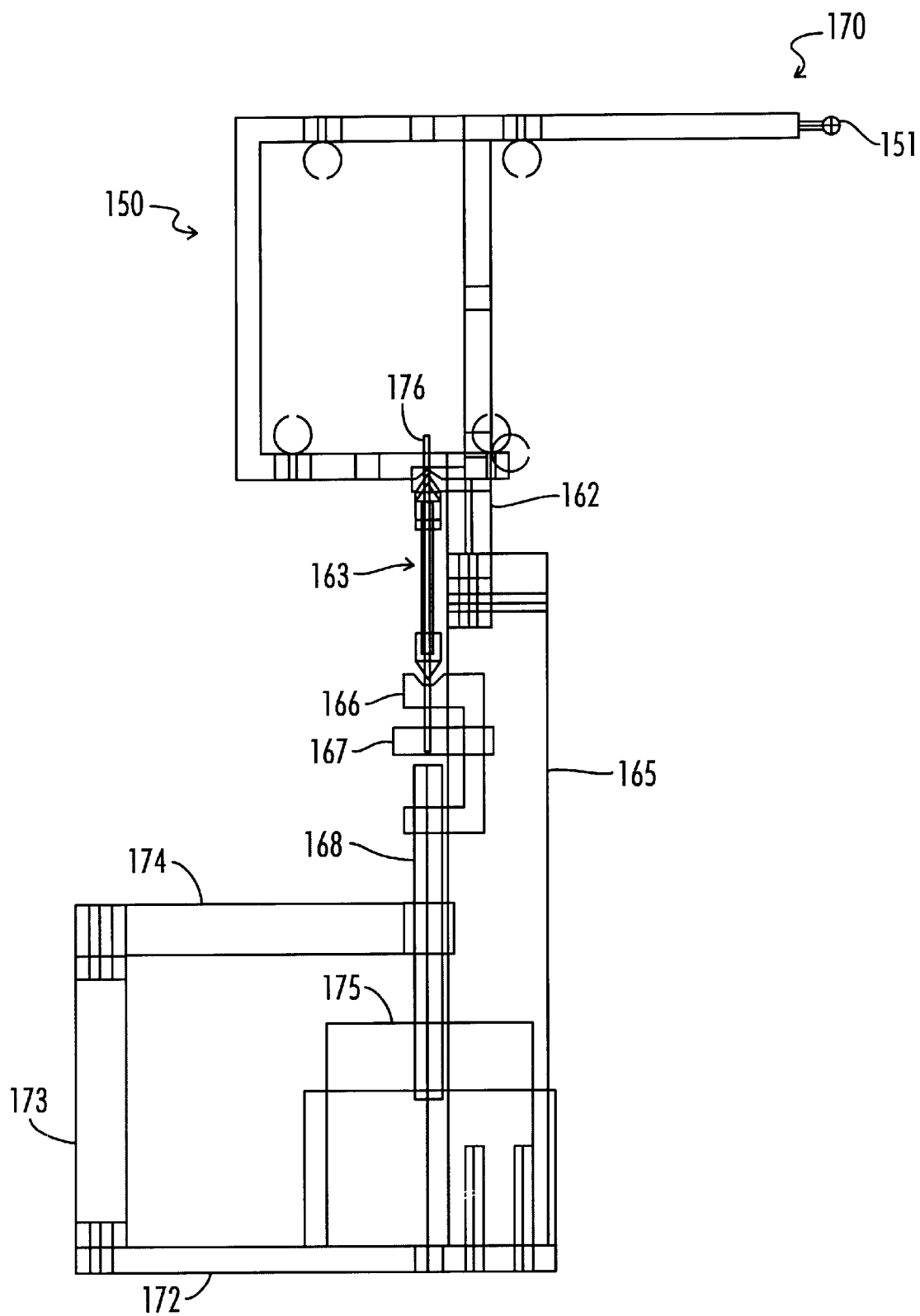

FIG. 9 is a side view of the two dof linkage shown in FIG. 8 incorporated into a microbot.

Figure 10:
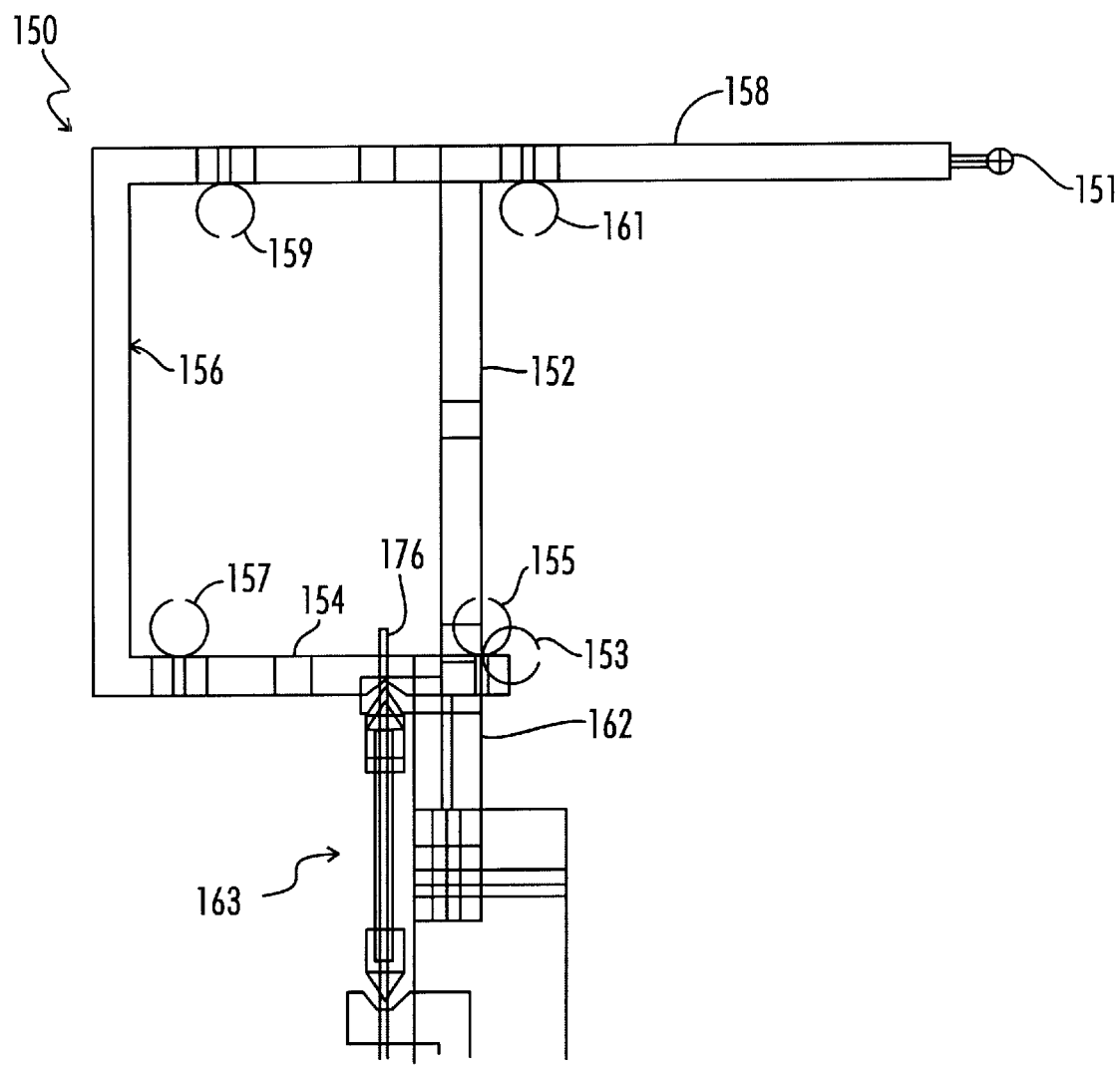

FIG. 10 is an enlarged-side view of the two dof linkage shown in FIG. 9.

Figure 11:
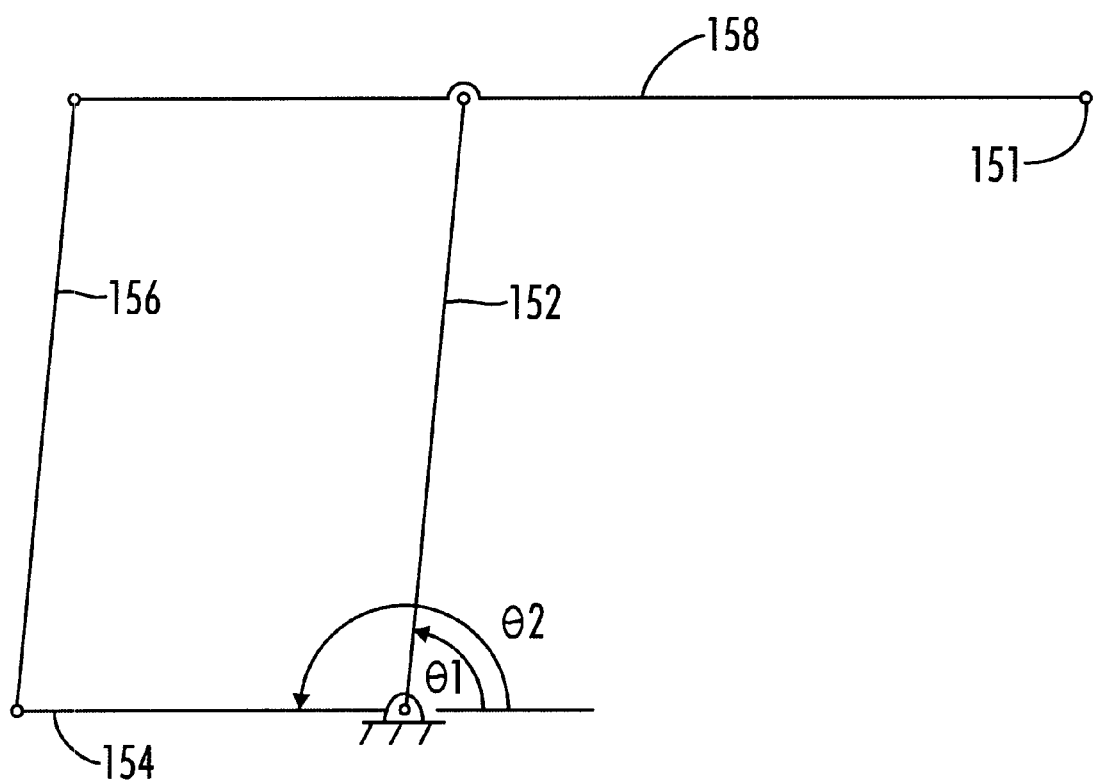

FIG. 11 is a pin-joint representation of the two dof linkage shown in FIG. 10.

Figure 12A:
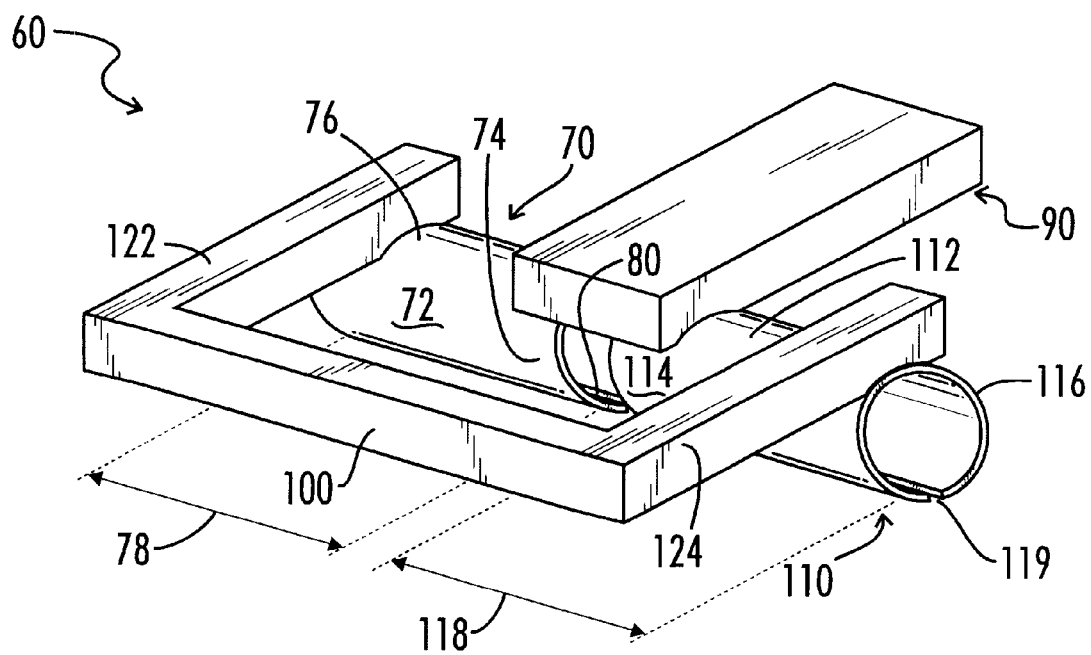
Figure 12B:
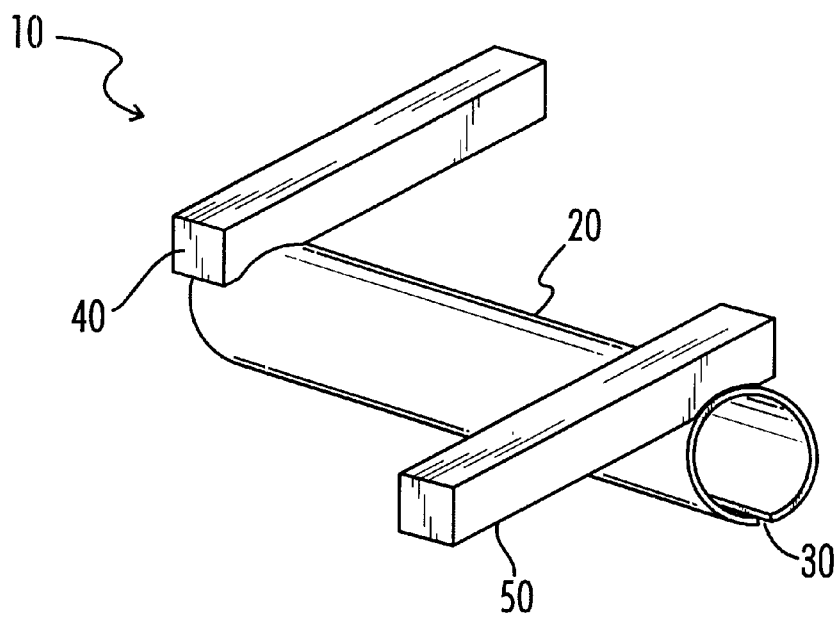

FIGS. 12a and 12b are perspective views illustrating the compound (top) and the simple (bottom) embodiments of the split-tube flexure of the present invention.

BEST MODE FOR CARRYING OUT THE INVENTION

The Mechanics of Open Versus Closed Sections

Figure 2A:
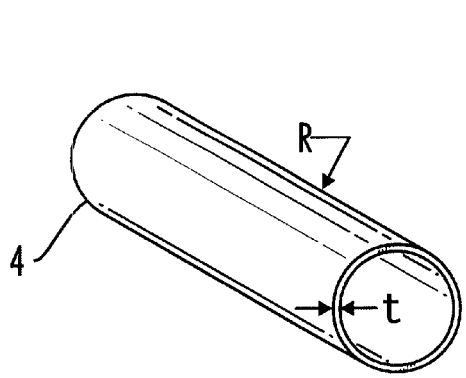
FIGS. 2a and 2b are perspective views of closed (left—FIG. 2a) and open (right FIG. 2b) section hollow shafts.
Figure 2B:
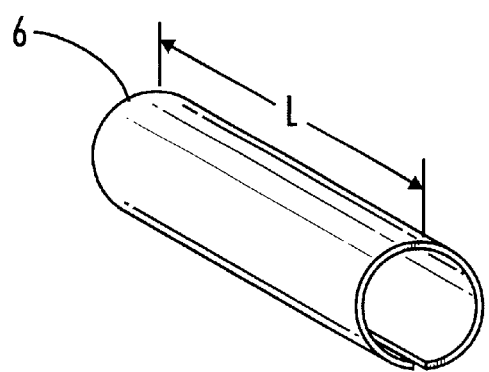

FIG. 2 shows two hollow shafts, 4 and 6, that are in every manner identical except that one, 6, has a slit along its long axis (a lengthwise slit, or slit). Each shaft having a length L, an outer radius R, and a wall thickness t. Though geometrically similar, the mechanics of how each bears a torsional load are quite different. For purposes of torsional mechanics, the wholly intact shaft reacts mechanically:in the same mode as a solid shaft, while the slitted shaft behaves mechanically as a thin flat plate. (Note that in the limit as R approaches infinity, a split cylinder approaches a flat plate.) This dissimilarity in behavior results in very different torsional stiffnesses. Defining torsional stiffness as the ratio of torque about the long axis to the angular deflection about the same, a stress analysis (assuming typical properties such as linearly elastic, homogeneous, isotropic material) illustrates the differences in torsional mechanics.

The torsional stiffness of the closed section, $k_{cs}$, is given by:

$$k_{cs} = \frac{2\pi G}{L} R^3 t$$

and that of the open section, $k_{os}$, given by:

$$k_{os} = \frac{2\pi G}{3L} R t^3$$

where G is the shear modulus of elasticity, and L, R, and t are the length, outside radius, and wall thickness of the shaft, respectively. Since by definition, the geometry of a thin-walled shaft is such that t<<R (typically t less than 0.15 R), the torsional stiffness of the open section is significantly less than of its closed counterpart. For example, a closed-section shaft of radius R=2.5 mm and wall thickness t=0.05 mm would exhibit a torsional stiffness approximately 7500 times that of a geometrically similar open section.

Figure 3B:
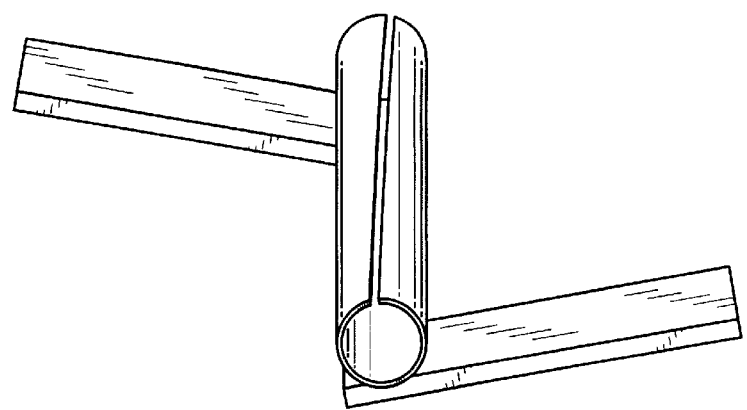
Figure 3C:
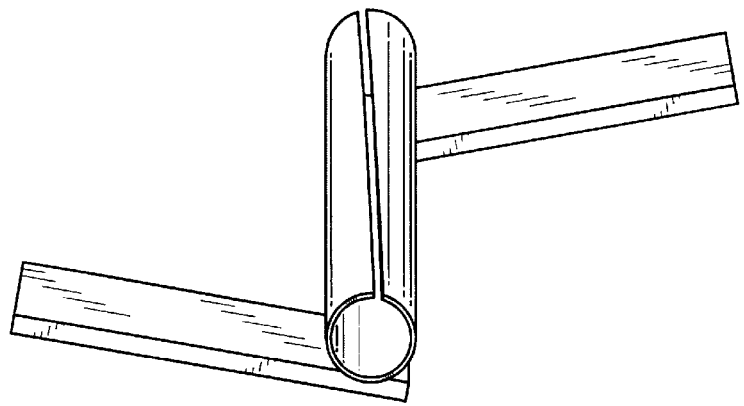

Though the torsional mechanics of the open and closed section shafts are quite different, the mechanics of bending are in essence the same. Both open and closed section shafts have a bending stiffness given by:

$$k_b = \frac{\pi E}{L} R^3 t$$

where E is the modulus of elasticity, and the other variables are as defined previously. Note that this stiffness is quite similar to the torsional stiffness of a closed section shaft. In fact, in the limit of t<<R, the joint structure would have a zero torsional stiffness and an infinite bending stiffness, emulating the ideal revolute joint without the corresponding backlash and Coulomb friction. This, in essence, characterizes the design of the split-tube flexure. FIG. 3a–3c show a split-tube flexure hinge. FIG. 3a is of a relaxed position, 3a and 3c are of flexed positions, i.e. the links have been moved through some angle of revolution. Note that the axis of rotation is along the top of the tube opposite the split, and not through the center of the tube. Also, the links adjoined by the flexure hinge remain parallel and perpendicular to the axis of rotation though the slit moves with torsion of the cylinder.

The Split-tube Versus the Conventional Flexure

FIG. 6a and 6b show an embodiment of this invention, a single split-tube flexure 10. It shows a thin-walled shaft 20 including a slit 30. The thin-walled shaft 20 generally includes an outer radial dimension R, a wall 25 having, thickness t, and a length L. The length L being defined between mounting holes near a first end 21 and :a second end 23. The slit 30 is a lengthwise slit typically running the length of the shaft 20. In the embodiment shown, the shaft 20 includes a cylindrical, or tube, shape. Also included in the split-tube flexure 10 is a first link 40 attached to the shaft wall 25, and a second link 50 attached to the shaft wall 25. The first and second links 40 and 50 are attached to the wall at the first and second longitudinally spaced positions along the length of the tube 20. The torsional displacement is linearly related to the longitudinal spacing. The longitudinal spacing should be such that the links are not end to end, or the resultant flexure motion will be from bending of the wall, not torsion. It will be apparent that attaching the links on the wall includes attaching the links on the wall edges. Also the links need not be straight rods or bars as shown in FIGS. 6a and 6b.

The first link 40 and the second link 50 are shown with ends attached to ends of the shaft 20 such that the links 40 and 50 are transverse to, and as.shown perpendicular to, the lengthwise slit 30. In alternate embodiments, the links 40 and 50 need not be perpendicular to the slit 30, although, at least one link should be transverse to the slit 30. Transverse being defined as other than parallel. Also, the contact locations will typically be in a line parallel to the slit 30, preferably opposite the slit 30. The contact locations need not be aligned parallel to the slit 30, but the resultant forces, axis of rotation and the mathematics describing the structural dynamics will change.

FIG. 6b shows the split-tube flexure 10 of FIG. 6a further annotated. The thin-walled shaft 20 includes a bottom side 22, a top side 24, a fore side 26, and a back side 28. The first link 40 includes a first portion 42, a second portion 44, and a length 43. The second link 50 includes a first portion 52, a second portion 54, and a length 53. The links 40 and 50 are shown attached to the topside 24 of the shaft 20. The links 40 and 50, though typically attached to the topside 24 of the shaft 20, need not be attached to it.

FIG. 7 shows a conventional flexure joint 2. It includes a flexure beam width b, a flexure member height h, and a flexure length 1.

An analytical comparison is useful in assessing the relative mechanical characteristics of both a split-tube and a conventional flexure. FIGS. 4 and 5 illustrate split-tube 10 and conventional flexure 2 geometry, respectively, and define the loads (axial loads $F_1$ and $F_2$, and torsional loads $M_1$, $M_2$, and $\tau$) and deflections (x, y, $\phi_1$, $\phi_2$, and $\theta$) from which relevant stiffnesses can be, determined.

As previously mentioned, the objective in the design of a flexure revolute joint is to achieve a minimal stiffness along the axis of rotation and relatively large stiffnesses along all other axes. The inventors refer to the stiffness along the revolute axis as the revolute stiffness, which is defined by $k_\tau = \tau/\theta$. The off-axis stiffnesses of primary interest are the bending stiffnesses, defined by $k_{b1} = M_1/\theta_1$ and $k_{b2} = M_2/\theta_2$ and the axial stiffnesses, defined by $k_{a1} = F_1/x$ and $k_{a2} = F_2/y$. Also of primary interest when characterizing joint performance is the allowable range of motion afforded by the joint, a characteristic determined by material yield.

For purposes of comparison, a split-tube 10 and a conventional 2 flexure were designed according to desired specifications that were determined by the desired machine performance characteristics. The two Joints were designed to have the same revolute stiffness $k_\tau$, and the joints were required to have the same axial stiffness $k_{a1}$ and to withstand a given minimum axial load $F_1$. Additionally, the two joints were designed of the same stainless steel alloy. The resulting dimensions, as defined in FIGS. 6a and 7, are R=2.4 mm, t=0.05 mm, and L=9.5 mm for the split-tube flexure, and h=0.2 mm, b=0.2 mm, and l=5.4 mm for the conventional flexure.

The resulting stiffnesses, along with the ranges of motion are given in Table 1. The characteristics for the split-tube flexure 10 were experimentally verified. Experiments were additionally incorporated to determine maximum load before buckling, a mechanical quantity which is not as well analytically characterized as stiffness or yield. These experiments indicated that the split-tube flexures 10 could withstand approximately 8 Newtons before buckling, which is more than 3 times the 2.4 Newton capability of the conventional flexure 2.

Table 2 incorporates the same information as Table 1, but represented instead as the relative characteristics of the split-tube flexure with respect to the conventional flexure. The ratios of $k_\tau$ and $k_{a1}$ of the two flexures were set equal by design. One can observe from Table 2 that all other off-axis stiffnesses of the split-tube flexure 10, $k_{b1}$, $k_{b2}$, and $k_{a2}$ are three to four orders of magnitude larger than the equivalent off-axis stiffnesses of the conventional flexure 2. Note also that the split-tube flexure 10 enables 150 degrees of motion, more than five times that of the equivalent conventional flexure 2. This comparison clearly illustrates the improved revolute joint properties offered by the split-tube flexure 10.

Figure 1:
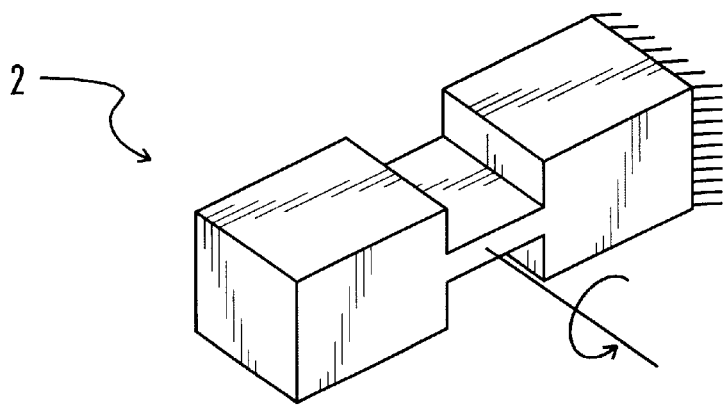
FIG. 1 is a perspective view of a conventional flexure joint, indicating the nominal joint axis of rotation.

Another significant difference between the split-tube 10 and conventional 2 flexure involves the kinematic behavior of the joints. An ideal revolute joint provides a fixed axis of rotation so that the motion of one link with respect to the adjoining link can be characterized as a pure rotation. The illustration of FIG. 1 depicts the instantaneous revolute axis associated with a conventional flexure joint. This axis does not remain fixed with respect to either link, but rather translates in the plane as the links rotate. In contrast, the split-tube flexure 10 has a fixed axis of rotation (opposite and parallel to the split) when the links are attached to the top side of the shaft and are perpendicular to the slit. This enables well-characterized kinematics with a minimal set of measurements.

TABLE 1

Comparison of conventional and split-tube flexure revolute joint properties.

| PROPERTY | CONVENTIONAL FLEXURE | SPLIT-TUBE FLEXURE |
|---|---|---|
| $k_r$ | 0.00525 Nm/rad | 0.00525 Nm/rad |
| $k_{b1}$ | 0.00525 Nm/rad | 43.8 Nm/rad |
| $k_{b2}$ | 0.00806 Nm/rad | 43.8 Nm/rad |
| $k_{a1}$ | $1.53 \times 10^6$ N/m | $1.45 \times 10^6$ N/m |
| $k_{a2}$ | 540 N/m | $1.45 \times 10^6$ N/m |
| $\theta_{max}$ | ±14.7 degrees | ±77.9 degrees |

TABLE 2

Relative characteristics of the split-tube flexure with respect to the conventional flexure.

| PROPERTY | CHARACTERISTICS OF SPLIT-TUBE RELATIVE TO CONVENTIONAL FLEXURE |
|---|---|
| $k_r$ | 1 |
| $k_{b1}$ | 8330 |
| $k_{b2}$ | 5440 |
| $k_{a1}$ | 0.95 |
| $k_{a2}$ | 2680 |
| $\theta_{max}$ | 5.3 |

Alternative embodiments will be apparent to those skilled the mechanical structures and dynamics arts. It will be apparent that the shaft would typically be a thin-walled cylinder where t <<R, however, it is equally apparent that the cross section of the shaft need not be circular. The shaft 20 may include an alternative cross section such as a polygon or other multi-sided cross section.

Furthermore, design characteristics may dictate that the shaft (or tube) not be thin-walled. The desired stiffness ratio drives the relationship between t and R. The invention is intended to include other than thin-walled embodiments. A preferred embodiment would, however, typically use a thin-walled cylinder. The reactive forces corresponding to applied loads will, of course, change with various embodiments of the invention. The invention can be used to achieve minimal force resistance along (or about) an axis of rotation, and relatively large force resistance along other axes. Linkages can be used to create minimal resistance along additional axes of rotation.

Mechanism Design

A revolute joint may be formed from a single or double split-tube arrangement. The double split-tube revolute joint, also referred to as a compound split-tube (see FIG. 12) has been incorporated into a parallel linkage to demonstrate kinematic features of the split-tube flexure. FIGS. 8*a* and 8*b* show perspective view of a two degree-of-freedom (dof) parallel linkage 150 to locate a point 151 within a 2 dof space. FIG. 9 shows a side view of the two dof linkage 150 incorporated into a microbot 170. FIG. 10 shows an enlarged side view of the linkage 150 shown in FIG. 9. As shown in FIGS. 8 through 10, a first set of split-tubes 153 connects a first link 152 to a frame 162. A second set of split-tubes 155 connects a second link 154 to the frame 162. The second link 154 being connected to a third link 156 with a third set of split-tubes 157. A fourth link 158 is connected to the third link 156 with a fourth set of split-tubes 159. A fifth set of split-tubes 161 connects the first link 152 to the fourth link 158 between the point 151 and the third link 156 connection 159.

Push-pull mechanisms 163 and 164 include a pivot at each end and a cable to attach the pivots to the links and an apparatus to push-pull the push-pull mechanisms. The push-pull mechanisms will also be referred to generally as knife-edge pivots. Knife-edge pivots 163 and 164 are connected to the first link 152 and 154, respectively. Push-pulling the knife-edge pivots 163 and 164 in a vertical plane results in a horizontal and vertical movement of point 151 through the kinematics of the linkage 150.

The location of point 151 can be determined as a function of link angles $\theta_1$ and $\theta_2$. The link angles are related to the vertical distance the knife-edge pivots move through.

FIG. 11 shows a pin-joint representation of the linkage 150. Link 152 is pin connected at the same location as link 154. The common axis of revolution is achieved by aligning the split-tube 153 and 155 so that the side opposite the respective slits, i.e. the attachment points, are co-linear.

The microbot 170 shown in FIG. 9 includes a T-beam support 165 attached to a base 172. An I-beam 173 attached to the base 172 supports support flexures 174. A threaded rod 168 is supported by the support flexures 174 and moved vertically by a voice coil 175. The threaded rod 168 push-pulls the knife-edge pivot 163. A tensioning screw 166 is used to tighten a cable 176 to secure the knife-edge pivot 163 to the second link 154 and a tension block 166. Similar connections are on the other side of the microbot (not shown).

The parallel linkage used in the microbot is simply for illustrative purposes. Clearly many other designs incorporating split-tube flexure joints will also be apparent to those skilled in the arts. In the embodiments shown in FIGS. 8 through 10 a transverse link can be included to add a third degree of freedom, thus allowing the point 151 to moved revolutely as well as vertically and horizontally.

FIGS. 12*a* and 12*b* illustrate the compound 60 and simple (or single) 10 joint configurations, both of which are constructed of tubes of equal radius and thickness, and both having the same overall length. Though a compound joint 60 is not limited to use of identical parts. The compound (split-tube) flexure 60 shown in FIG. 12*a* includes a first tube 70 having a wall 72 and having a first end 74 and a second end 76. A length 78 being defined from the first end 74 to the second end 76. The wall 72 also having a lengthwise slit 80. The compound flexure 60 also includes a second tube 110 having a wall 112 and having a first end 114 and a second end 116. A length 118 being defined from the first end 114 to the second end 116. The wall 112 also having a lengthwise slit 119. The second tube 110 is co-linear with the first tube 70 such that the first ends 74 and 114 face each other. A first link 90 is attached to the first tube 70 and the second tube 110 nearer to the first ends 74 and 114 of the tubes than the second ends 76 and 116 of the tubes. A second link 100 is attached to the first tube 70 nearer its second end 76 than its first end 74. The second link 100 is also attached to the second tube nearer its second end 116 than its first end 114.

In the embodiment shown in FIG. 12a, the second link 100 is a bifurcated link having first 122 and second 124 parallel portions attached to the first 70 and second 110 tubes, respectively. And the slits 80 and 119 are co-linear. The first 90 and second 100 links are attached to the first 70 and second 110 tubes at locations lying on a line parallel to the length of the tubes. While this is not required, it is one of the preferred embodiments of the invention because the axis of rotation is constant along the tubes opposite the slit. The axes of rotation of the tubes should be co-linear.

Mechanical analysis shows that for the revolute, axial, and bending stiffnesses defined previously, the compound configuration exhibits 4 times the revolute stiffness, 64 times the axial stiffness, and 16 times the bending stiffness of the simple joint configuration. A flexure-based revolute joint can be characterized by the ratio of revolute stiffness to axial stiffness and the ratio of revolute stiffness to bending stiffness, both of which in the ideal case would approach zero. Though the absolute value of the revolute stiffness is 4 times larger for the compound joint, the ratio of revolute to axial stiffness and of revolute to bending stiffness are 16 and 4 times smaller, respectively, than the simple joint.

It will be apparent to those skilled in the mechanical arts to combine a number of single flexures as well as compound flexures to achieve minimal rotational force resistance about select axes of rotation while maintaining relatively large force resistance along other axes.

Thus, although there have been described particular embodiments of the present invention of a new and useful Split Tube Flexure, it is not intended that such references be construed as limitations upon the scope of this invention except as set forth in the following claims.

What is claimed is:

1. The split-tube flexure joint comprising
   a first tube having a wall, a first end, and a second end, a length of the tube being defined from the first end to the second end, the wall having a lengthwise slit defined therein along a longitudinal axis of the tube from the first end to the second end;
   first and second links tangentially attached to an exterior surface of the wall at respective first and second contact points along a contact line extending proximate the exterior surface of the wall and parallel to the longitudinal axis of the tube; and,
   each of the first and second links extending transversely to the slit;
   the first tube having an axis of rotation;
   a second tube having an axis of rotation, a first end, and a second end, the first end of the second tube facing the first end of the first tube such that the axis of rotation of each tube aligns;
   the first link being attached to each of the first and second tube nearer to their first ends than to their second ends; and
   the second link being attached to each of the first tube and second tubes nearer to their second ends than to their first ends.

2. The split-tube flexure joint of claim 1, wherein the first and second links are attached to the second tube at locations lying on a line parallel to the length of the tubes.

3. The split-tube flexure joint of claim 1, wherein the first link and the second link are attached to the second tube at locations lying on a line parallel to the length of the tubes.

4. The split-tube flexure joint of claim 1, wherein the first tube is co-linear with the second tube.

5. The split-tube flexure joint of claim 1, wherein the first and second links are attached to the first and second tubes at locations lying on a line parallel to the length of the tubes.

6. The split-tube flexure joint of claim 1, wherein the first and second links are parallel to each other when the flexure-joint is in a relaxed state.

7. The split-tube flexure joint of claim 1, wherein the first and second links are transverse to each other when the flexure-joint is in a relaxed state.

8. A split-tube flexure comprising:
   a first thin-walled hollow shaft having a wall, a length, the wall having a lengthwise slit defined therein;
   a first link tangentially attached to the wall;
   a second link tangentially attached to the wall, the second link having a length, the second link length being transverse to slit;
   the first and second links contacting the wall at respective first and second contact points along a contact line extending proximate an exterior surface of the wall and parallel to the length of the shaft;
   the first shaft including first and second ends and an axis of rotation; a second thin-walled hollow shaft having a first end, a second end, a lengthwise slit defined therein and an axis of rotation, the first end facing the first end of the first shaft such that the axis of rotation of the first shaft is co-linear with the axis of rotation of the second shaft; the first link being attached to both the first and second shafts nearer to their first ends than to their second ends; and
   the second link being attached to both the first and second shafts nearer to their second ends than to their first ends.

9. The split-tube flexure of claim 8, wherein the second link comprises a bifurcated link having first and second parallel link portions attached to the first and second shafts, respectively.

10. The split-tube flexure of claim 8, wherein the slit of each the first and the second shafts are co-linear.

11. The split-tube flexure of claim 10, wherein the first and second links are attached to the first and second shafts at locations diametrically opposed to the slits in the first and second shafts.

12. The split-tube flexure of claim 8, wherein the first and second links are attached to the first and second shafts at locations lying on a line parallel to the first shaft.

13. A method of providing pivotal motion, the method comprising constructing a first flexure joint by
   providing a first thin-walled shaft having a lengthwise slit;
   attaching a first link to the thin-walled shaft, the first link extending transversely to the slit;
   attaching a second link to the first thin-walled shaft;
   extending the second link transversely to the slit;
   the first and second links tangentially contacting the shaft at respective first and second contact points along a contact line extending proximate an exterior surface of the shaft and parallel to the slit;
   applying a first force at the first link, the first force having a vector component perpendicular to the slit; and
   creating at the second link reactive forces reactive to the first force, and thereby achieving minimal force resistance along an axis of rotation and relatively large force resistance along other axis of the flexure joint.

14. The method of claim 13 further comprising forming a first compound split-tube flexure by providing a second thin-walled shaft having a lengthwise slit;

aligning the second shaft co-linear with the first shaft so that a first end of the first shaft faces a first end of the second shaft;

attaching the first link to the first and second shafts proximate their first ends; and attaching the second link to the first and second shafts at locations spaced from the first link toward the second ends of each shaft.

15. The method of claim 14, further comprising attaching the first and second links to the first and second shafts at locations lying on a line parallel to the first shaft.

16. The method of claim 14, further comprising forming a linkage, including the step of connecting a second compound split-tube flexure to the first compound split-tube flexure.

17. The method of claim 13, further comprising forming a linkage, including the step of constructing a second flexure joint similar to the first flexure joint and connecting the second flexure joint to the first flexure joint.

* * * * *